United States Patent [19]

St. Clair et al.

[11] Patent Number: 5,973,016

[45] Date of Patent: *Oct. 26, 1999

[54] RESILIENT POLYURETHANE FOAMS OF POLYDIENE DIOLS AND OIL

[75] Inventors: David John St. Clair; Hector Hernandez, both of Houston, Tex.

[73] Assignee: Shell Oil Company, Houston, Tex.

[*] Notice: This patent is subject to a terminal disclaimer.

[21] Appl. No.: 09/081,558

[22] Filed: May 19, 1998

Related U.S. Application Data

[60] Provisional application No. 60/047,521, May 23, 1997.

[51] Int. Cl.⁶ ..................................................... C08G 18/02
[52] U.S. Cl. ........................... 521/129; 521/132; 521/170
[58] Field of Search ..................................... 521/129, 132, 521/170

[56] References Cited

U.S. PATENT DOCUMENTS

| | | | |
|---|---|---|---|
| 3,314,903 | 4/1967 | Belak | 521/132 |
| 3,714,110 | 1/1973 | Verdol | 528/76 |
| 5,710,192 | 1/1998 | Hernandez | 521/155 |
| 5,849,806 | 12/1989 | St. Clair et al. | 521/132 |

*Primary Examiner*—Rachel Gorr
*Attorney, Agent, or Firm*—Beverlee G. Steinberg

[57] ABSTRACT

There is provided a high resilience polyurethane foam produced from a polydiene diol having a number average molecular weight from 1,000 to 20,000 and a functionality of from 1.6 to 2, an aromatic polyisocyanate, and oil. The polydiene diol foams have excellent processability, producing high resilience foams having small cell size and uniform cell size distributions.

16 Claims, No Drawings

RESILIENT POLYURETHANE FOAMS OF POLYDIENE DIOLS AND OIL

This application claims the benefit of U.S. Provisional Application Ser. No. 60/047,521, filed May 23, 1997, the entire disclosure of which is hereby incorporated by reference.

FIELD OF THE INVENTION

This invention relates to flexible polyurethane foams containing a polyol and oil, particularly a hydrogenated polybutadiene diol and an oil.

BACKGROUND OF THE INVENTION

Polyurethane foams having high resilience are typically produced from polyether triol and an isocyanate. The polyether triols typically have a number average molecular weight from 4,500 to 6,000 and an average functionality of from 2.4 to 2.7 hydroxyl groups per molecule. Toluene diisocyanate, diphenyl methane diisocyanate, toluene diisocyanate/diphenyl methane diisocyanate mixtures, and modified toluene diisocyanate or diphenyl methane diisocyanate versions are used to produce foams with broad processing latitude. Isocyanate functionality is typically 2.0, and in most cases not higher than 2.3 isocyanate groups per molecule. The polyether triols form resilient foams when combined with the isocyanates having from 2.0 to 2.3 isocyanate groups per molecule under conditions which promote foaming.

U.S. Pat. No. 4,939,184 described the production of polyurethane foams from polyisobutylene triols and diols which were prepared cationically. The polyisobutylenes are premixed with an isocyanate, namely an isocyanate which is a mixture of meta- and para- isomers of toluene diisocyanate having a functionality of 2.0. Then water was added as a blowing agent to form the polyurethane foam. Foams obtained were of low resilience and were useful in energy absorbing applications.

U.S. patent application Ser. No. 08/494,640, incorporated herein by reference, described a high resilience polyurethane foam produced from a polydiene diol. The foam's resiliency was achieved by adding an aromatic polyisocyanate having a functionality of from 2.5 to 3.0 isocyanate groups per molecule to assure adequate crosslinking. The polydiene diol foams produced showed excellent humid aging properties in comparison to conventional polyurethane foams.

U.S. Pat. No. 5,710,192, incorporated herein by reference, described a high resilience, high tear resistance polyurethane foam produced from a polydiene diol. The foam's resiliency was achieved by selecting an appropriate amount of a aromatic polyisocyanate having a functionality of from 1.8 to 2.5 isocyanate groups per molecule to assure adequate crosslinking. The polydiene diol foams produced showed excellent tear resistance and were near white in color.

In the above described foams, difficulty is encountered in both the processability and in the control of cell size and cell distribution. It is desirable to have a highly processable foam with small, uniform cell sizes and distribution while retaining adequate resilient foam properties.

SUMMARY OF THE INVENTION

Surprisingly, it has been found that the addition of up to 50%w oil to a polyurethane foam produced from a polydiene diol will result in highly processable foams. The composition of the present invention comprises a high resilience polyurethane foam produced from a polydiene diol having a number average molecular weight from 1,000 to 20,000, an aromatic polyisocyanate, and oil. The polydiene diol foams display small, uniformly distributed cells and have excellent resilience.

DESCRIPTION OF THE DRAWINGS

FIG. 1 shows the effect of oil on viscosity.

FIG. 2 shows the effect of oil on foam density.

FIG. 3 shows the effect of water content on the density of foams like those of the invention.

DETAILED DESCRIPTION OF THE INVENTION

The present invention is a resilient polyurethane foam comprising 100 parts by weight (pbw) of a polydiene diol having a number average molecular weight from 1,000 to 20,000, more preferably from 1,000 to 10,000, most preferably from 3,000 to 6,000, from 20 to 55 pbw of an aromatic polyisocyanate, up to 200 pbw of a hydrocarbon processing oil, and a blowing agent. In a preferred embodiment, the polydiene diol is hydrogenated and has a functionality of from 1.6 to 2, more preferably from 1.8 to 2, hydroxyl groups per molecule, and the polyisocyanate used has a functionality of from 2.5 to 3.0 isocyanate groups per molecule. The isocyanate is preferably added at a concentration which gives an equal number of isocyanate groups and hydroxyl groups. The foam has lower viscosity during the manufacturing process and more uniform cell structure in comparison to foams made without oil.

The polydiene diols used in this invention are prepared anionically such as described in U.S. Pat. Nos. 5,376,745, 5,391,663, 5,393,843, 5,405,911, and 5,416,168 which are incorporated by reference herein. The polydiene diols provide stable, resilient foams when the polydiene diol is hydrogenated, although unsaturated polydiene diols will also result in polyurethane foams having high resilience. The polydiene diols have from 1.6 to 2, more preferably from 1.8 to 2 terminal hydroxyl groups per molecule. An average functionality of, for example, 1.8 means that about 80% of the molecules are diols and about 20% of the molecules are mono-ols. Since the majority of the product's molecules have two hydroxyl groups, the product is considered a diol. The polydiene diols of the invention have a number average molecular weight between 1,000 and 20,000, more preferably from 1,000 to 10,000, most preferably from 3,000 to 6,000. Hydrogenated polybutadiene diols having a 1,4-addition between 30% and 70% are preferred.

Polymerization of the polydiene diols commences with a monolithium initiator containing a protected hydroxyl group or dilithium initiator which polymerizes a conjugated diene monomer at each lithium site. Due to cost advantages, the conjugated diene is typically 1,3-butadiene or isoprene, although other conjugated dienes will also work well in the invention. When the conjugated diene is 1,3-butadiene and when the resulting polymer will be hydrogenated, the anionic polymerization may be controlled with structure modifiers such as diethylether or 1,2-diethoxyethane to obtain the desired amount of 1,4-addition.

Anionic polymerization is terminated by addition of a functionalizing agent prior to termination. Functionalizing agents used are like those in U.S. Pat. Nos. 5,391,637, 5,393,843, and 5,418,296, incorporated herein by reference. The preferred functionalizing agent is ethylene oxide.

The polydiene diols are preferably hydrogenated to improve stability such that at least 90%, preferably at least 95%, of the carbon-to-carbon double bonds in the diols are saturated. Hydrogenation of these polymers and copolymers may be carried out by a variety of well established processes including hydrogenation in the presence of such catalysts as RANEY® Nickel, noble metals such as platinum and the like, soluble transition metal catalysts and titanium catalysts as described in U.S. Pat. No. 5,039,755, incorporated herein by reference.

The diene microstructures are typically determined by $C^{13}$ nuclear magnetic resonance (NMR) in chloroform. It is desirable for the polybutadiene diols to have at least about 40% 1,2-butadiene addition because, after hydrogenation, the polymer will be a waxy solid at room temperature if it contains less than about 40% 1,2-butadiene addition. Preferably, the 1,2-butadiene content is between about 40 and 60%. Isoprene polymers should have at least 80% 1,4-isoprene addition in order to reduce the glass transition temperature ($T_g$) and viscosity.

The polydiene diols used in the invention have hydroxyl equivalent weights between about 500 and about 10,000, more preferably between 500 and 5,000, most preferably between 1,500 and 3,000. Thus, for the polydiene diols, suitable number average molecular weights will be between 1,000 and 20,000, more preferably between 1,000 and 10,000, most preferably between 3,000 and 6,000. For example, a hydrogenated polydiene diol used in developing FIGS. 1 and 2 had a number average molecular weight of 3300, a functionality of 1.92, and a 1,2-butadiene content of 54%. The polymer was hydrogenated to remove more than 99% of the carbon to carbon double bonds. This polymer is referred to hereinafter as Diol 1.

The number average molecular weights referred to herein are number average molecular weights measured by gel permeation chromatography (GPC) calibrated with polybutadiene standards having known number average molecular weights. The solvent for the GPC analysis is tetrahydrofuran.

The isocyanates used in this invention are aromatic polyisocyanates since they have the desired fast reactivity to make foam. As the saturated polydiene diol has a functionality of about 2 hydroxyl groups per molecule, a polyisocyanate having a functionality of from 1.8 to 3.0, preferably 2.5 to 3.0, is used to achieve a crosslink density that results in a stable, high loadbearing and high resilient foam. Using isocyanates of lower functionality results in less stable foams having lower loadbearing capacity and having reduced resiliency. Higher isocyanate functionality will result in foam having a too high closed cell content which will negatively influence the physical properties.

An example of a suitable aromatic polyisocyanate is MONDUR® MR (Bayer), a polymeric diphenyl methane polyisocyanate which typically has an isocyanate functionality of 2.7. Also used is RUBINATE® 9225 (ICI Americas), a liquid isocyanate consisting of a mixture of 2,4-diphenyl methane diisocyanate and 4,4-diphenyl methane diisocyanate with a functionality of 2.06; however the addition of oil to a foam made with this lower functionality polyisocyanate may result in foam collapse, requiring formulation adjustment.

The oils useful in the invention are petroleum based process oils. The compositions of these oils may range from paraffinic through naphthenic to highly aromatic types. Oils are available covering a wide range of viscosities, from about 10 to about 1000 centipoise at 100° F. An example of a suitable oil for use in the invention is SHELLFLEX® 371 (Shell Oil Company), a paraffinic/naphthenic process oil having a viscosity of 80-centipoise at 100° F.

Because the polydiene diol is a hydrocarbon, it has excellent compatibility with hydrocarbon process oils. Further, there is no tendency for the oil to bleed out of the foam. Addition of oil to the formulation reduces the viscosity, thereby improving processability. FIG. 1 shows how the viscosity of polydiene diol (Diol 1) blended with oil (SHELLFLEX® 371) depends on the amount of oil in the blend. Oil additions up to 200 parts by weight per hundred parts of polydiene diol resin (phr) will lower the viscosity by a factor of 10 at any given temperature. This reduction in viscosity makes the foams of the present invention easier to make than previous foams, resulting in a more uniform and smaller cell size.

FIG. 2 shows the effects of the concentration of oil (SHELLFLEX® 371) on the foam density of a polydiene diol (Diol 1) blended with a polyisocyanate (MONDUR® MR) and water. Increasing the oil content from 0 to 200 phr about triples the density. The denser foams have smaller cells and very uniform cell size distributions.

The essential components of the polyurethane foams of this invention are the polydiene diol, the aromatic polyisocyanate, a blowing agent such as water, oil, catalysts, and a surfactant. Other ingredients like fire retardants, fillers, etc. may be added by those skilled in the art of making foam. The water, which causes foaming by reaction with the isocyanate to generate $CO_2$, may be varied to alter the foam density. Typically the water content is in the range of from about 0.5 phr to 3.5 phr. Examples of an amine catalyst, delayed action amine catalyst, and silicon surfactant useful in making polyurethane foams from polydiene diols are DABCO® 33-LV amine catalyst, DABCO® DC-1 delayed action amine catalyst, and DABCO® DC-5160 silicone surfactant, all from Air Products and Chemicals.

The polyurethane foams are preferably prepared by blending all of the components except the isocyanate. The polydiene diol is preferably preheated to reduce viscosity prior to blending. After blending, the aromatic polyisocyanate is quickly added and briefly stirred before pouring the mixture into a mold to hold the expanding foam.

The polyurethane foams of the present invention are useful for making articles like seat cushions, carpet backings, gaskets, and air filters.

DETAILED DESCRIPTION OF PREFERRED EMBODIMENTS

The preferred embodiment of the present invention is a resilient polyurethane foam comprising 100 parts by weight of a hydrogenated polydiene diol having a number average molecular weight from 3,000 to 6,000 and a functionality of from 1.8 to 2.0 hydroxyl groups per molecule, from 0.5 to 3.5 parts by weight of water, an aromatic polyisocyanate having a functionality of from 2.5 to 3.0 isocyanate groups per molecule at a concentration which will give an equal number of isocyanate and hydroxyl groups, from 20 to 200 parts by weight oil, from 0.4 to 0.8 parts by weight of an amine catalyst, from 0.3 to 0.6 parts by weight of a delayed action amine catalyst, and from 0 to 0.06 parts by weight of a silicon surfactant. The foam shows superior cell size and cell size distribution in comparison to foams made without oil.

The following examples are not intended to limit the present invention to specific embodiments although each example may support a separate claim which is asserted to be a patentable invention.

EXAMPLES

Eight foams were prepared using polymer, isocyanate (MONDUR® MR), catalyst (DABCO® 33-LV and DABCO® DC-1), surfactant (DABCO® DC-5160), and water in the combinations as shown in Table 1. Samples 2–6 also contained a hydrocarbon process oil (SHELLFLEX® 371) and are the samples which demonstrate the invention. Sample 1 is a comparative example which contains no oil. Sample 8 is another comparative example containing oil but using a conventional polyether polyol.

In the typical preparation, the polymer and oil were preheated to 80° C. All the components in the formulation except the isocyanate were weighed into a dried can and mixed using a CAFRAMO® stirrer equipped with a 2-inch, regular pitch impeller. Isocyanate was then added and mixing was continued for about 45 seconds. By this time the mass would begin to foam and was poured into a paper bucket. After the foam stabilized and a skin formed, the foam was postbaked in an oven for ten (10) minutes at 110° C. Specimens were cut from the bun for measurement of foam density, hardness at 40% compression, resilience and hysteresis.

Density

Density was determined from the weight of a block and its dimensions. Results are given in Table 2.

Resilience

A 16 mm diameter (16.3 g) steel ball was dropped from a height of 51.6 cm through a 38 mm inside diameter clear plastic tube onto a block of foam measuring 10×10×5 cm. The rebound height was measured and resilience was calculated as 100× (rebound height/drop height). Results are given in Table 2.

Compression Hardness and Hysteresis Loss

Compression hardness and hysteresis loss were measured on an INSTRON® Machine Model 5565. A foam block measuring 10×10×5 cm was placed between two parallel plates and compressed 60% then unloaded for four cycles at a crosshead speed of 12.5 m/min. On the fourth cycle, the force required to compress the foam 40% was recorded, giving a measure of compression hardness of the foam. Hysteresis loss was calculated as the area under the stress/height curve on the fourth cycle relative to the first cycle. Results are given in Table 2.

TABLE 1

Foam Formulations

| Sample | Diol[1] (phr) | Oil (phr) | Water (phr) | Isocyanate (phr) | Delayed Action Amine Catalyst (phr) | Amine Catalyst (phr) | Surfactant (phr) |
|---|---|---|---|---|---|---|---|
| 1 | 100 | 0 | 1 | 23.5 | 0.4 | 0.3 | 0.02 |
| 2 | 100 | 11.1 | 1 | 23.5 | 0.4 | 0.3 | 0.02 |
| 3 | 100 | 33.3 | 1 | 23.5 | 0.4 | 0.3 | 0.02 |
| 4 | 100 | 100 | 1 | 23.5 | 0.4 | 0.3 | 0.02 |
| 5 | 100 | 200 | 1 | 22.1 | 0.4 | 0.3 | 0.02 |
| 6 | 100 | 200 | 2 | 37.0 | 0.4 | 0.3 | 0.02 |
| 7 | 100 | 200 | 3 | 51.8 | 0.8 | 0.6 | 0.04 |
| 8 | 100 | 100 | 1 | 23.5 | 0.4 | 0.3 | 0.02 |

[1]Samples 1–7 used a hydrogenated polybutadiene diol, Mn = 3300, f = 1.92; Sample 8 used a 4800 molecular weight polyether triol (ARCOL® 11–34)

TABLE 2

Foam Properties

| Sample | Density (g/l) | Hardness at 40% Compression (N) | Resilience (%) | Hysteresis Loss (%) | Cell Size Distribution | Foam Cell Structure |
|---|---|---|---|---|---|---|
| 1 | 109 | 27.8 | 50 | 14 | broad | very fine |
| 2 | 124 | 31.0 | 54 | 13 | broad | very fine |
| 3 | 135 | 23.5 | 56 | 16 | narrow | very fine |
| 4 | 202 | 20.8 | 50 | 13 | very narrow | very fine |
| 5 | 339 | — | 32 | — | very narrow | very fine |
| 6 | 267 | — | 50 | — | very narrow | fine |
| 7 | 163 | 9.6 | 36 | 8 | very narrow | fine |
| 8[a] | — | — | 15 | — | — | medium |

[a]Foam was very oily and exhibited poor strength

Samples 1–5 were similar formulations with increasing oil contents from Sample 1 (oil-free) to Sample 5 (200 phr oil). Samples 1–5 all contained 1 phr water and so they all foamed to about the same volume, each expanding by a factor of approximately 10. With increasing amounts of oil added to that volume, the densities are seen to increase with increasing oil content. It can be seen that addition of 11 phr oil (Sample 2) has essentially no effect on the properties or qualitative appearance of the foam. Addition of 33 phr oil (Sample 3) reduced the cell size distribution somewhat with only a small effect on density. Additions of 100 to 200 phr oil (Samples 4 and 5) resulted in foams with small cell sizes of very uniform distribution but noticeably denser (heavier) foams. No tendency was seen for the oil to bleed from any of these foams.

Samples 5–7 and FIG. 3 show the effects of increasing the water content in foams containing 200 phr oil. The higher water content and resultant increase in isocyanate content cause more foaming, thereby reducing the foam density. It is believed that a foam containing 200 phr would reach a density of 110 g/l at about 4 phr water content, an equivalent density to the oil-free Sample 1. However, this high oil foam would be expected to have lower compression hardness and cohesive strength than the oil-free foam of the same density.

Sample 8 was a conventional foam based on polyether polyol to which oil was added. It can be seen that these conventional type foams are not suitable for oil additions. The foam has an oily feel and bleeds oil due to the incompatibility of the oil and the polyether polymer.

While this invention has been described in detail for purposes of illustration, it is not construed as limited thereby but is intended to cover all changes and modifications within the spirit and scope thereof.

I claim:

1. A polyurethane foam composition comprising:
    100 parts by weight of a hydrogenated polydiene diol having a number average molecular weight from 1,000 to 20,000;

an aromatic polyisocyanate;

from 20 to 200 parts by weight oil; and a blowing agent.

2. A composition according to claim 1, wherein the polydiene diol has a functionality of from 1.6 to 2 hydroxyl groups per molecule, and wherein the polyisocyanate has a functionality of from 1.8 to 3.0 isocyanate groups per molecule.

3. A composition according to claim 2 wherein the polyisocyanate is at a concentration which gives an equal number of isocyanate groups and hydroxyl groups.

4. A composition according to claim 2 wherein the polyisocyanate has a functionality of from 2.5 to 3.0 isocyanate groups per molecule.

5. A composition according to claim 4 wherein the blowing agent is water and wherein the concentration of water is between about 0.5 parts by weight and about 3.5 parts by weight per hundred parts diol.

6. A composition according to claim 2, wherein the polydiene diol is a polybutadiene diol.

7. A composition according to claim 2, wherein the polydiene diol has a number average molecular weight of 3,000 to 6,000.

8. A composition according to claim 7 wherein the polydiene diol has a functionality of from 1.8 to 2 hydroxyl groups per molecule.

9. A composition according to claim 8, wherein the polydiene diol is a polybutadiene diol.

10. A composition according to claim 2, wherein the aromatic polyisocyanate has a functionality of 2.7.

11. A polyurethane foam produced by a process comprising the steps of:

combining 100 parts by weight of a hydrogenated polydiene diol having a number average molecular weight from 1,000 to 20,000 and a functionality of from 1.6 to 2 hydroxyl groups per molecule with an aromatic polyisocyanate having a functionality of from 2.5 to 3.0 isocyanate groups per molecule and from 20 to 200 parts by weight oil; and foaming the combined polydiene diol, aromatic polyisocyanate and oil to form a resilient polyurethane foam.

12. A polyurethane foam according to claim 11, wherein foaming agents are combined with the polydiene diol and oil prior to combination of the aromatic polyisocyanate.

13. A polyurethane foam according to claim 12, wherein the foaming agents comprise water, an amine catalyst, a delayed action amine catalyst, and a silicon surfactant.

14. A polyurethane foam produced by a process comprising the steps of:

mixing 100 parts by weight of a hydrogenated polydiene diol having a number average molecular weight from 1,000 to 10,000 and a functionality of from 1.8 to 2.0 hydroxyl groups per molecule with from 20 to 200 parts by weight oil, from 1 to 2 parts by weight of water, from 0.4 to 0.8 parts by weight of an amine catalyst, from 0.3 to 0.5 parts by weight of a delayed action amine catalyst, and from 0.02 to 0.04 parts by weight of a silicon surfactant; and adding a polymeric isocyanate, wherein the polymeric isocyanate has a functionality of from 2.5 to 3.0 isocyanate groups per molecule and is added at a concentration which gives an equal number of isocyanate groups and hydroxyl groups.

15. A polyurethane foam according to claim 14, wherein the polydiene diol has from 40% to 60% 1,2-addition of butadiene.

16. A polyurethane foam according to claim 15, wherein the polymeric polyisocyanate has a functionality of 2.7.

* * * * *